(12) United States Patent
Peng et al.

(10) Patent No.: US 11,415,469 B2
(45) Date of Patent: Aug. 16, 2022

(54) EDGE-CLOUD COLLABORATION PLATFORM FOR INTELLIGENT COKING MONITORING OF CRACKING FURNACE TUBES AND WORKING METHOD THEREOF

(71) Applicant: GUANGDONG UNIVERSITY OF PETROCHEMICAL TECHNOLOGY, Guangdong (CN)

(72) Inventors: Zhiping Peng, Guangdong (CN); Qinghua Zhang, Guangdong (CN); Jinbo Qiu, Guangdong (CN); Junfeng Zhao, Guangdong (CN); Yuanhong Mao, Guangdong (CN); Gongyi Fu, Guangdong (CN); Zhaolin Yin, Guangdong (CN); Xihai Deng, Guangdong (CN); Delong Cui, Guangdong (CN); Qirui Li, Guangdong (CN); Jieguang He, Guangdong (CN)

(73) Assignee: GUANGDONG UNIVERSITY OF PETROCHEMICAL TECHNOLOGY, Guangdong (CN)

( * ) Notice: Subject to any disclaimer, the term of this patent is extended or adjusted under 35 U.S.C. 154(b) by 0 days.

(21) Appl. No.: 17/244,559

(22) Filed: Apr. 29, 2021

(65) Prior Publication Data
US 2021/0247246 A1  Aug. 12, 2021

Related U.S. Application Data

(63) Continuation of application No. PCT/CN2020/092649, filed on May 27, 2020.

(30) Foreign Application Priority Data

Jun. 18, 2019 (CN) .......................... 201910526431.4

(51) Int. Cl.
*G01K 13/02* (2021.01)
*C10G 9/20* (2006.01)
*G06K 9/62* (2022.01)

(52) U.S. Cl.
CPC ............. *G01K 13/02* (2013.01); *C10G 9/206* (2013.01); *G06K 9/6232* (2013.01);
(Continued)

(58) Field of Classification Search
CPC ............................... G01K 13/02; C10G 9/206
See application file for complete search history.

(56) References Cited

U.S. PATENT DOCUMENTS

2010/0310113 A1* 12/2010 Esmaili ............... F27D 21/0014
374/124
2019/0093186 A1  3/2019 Lee et al.

FOREIGN PATENT DOCUMENTS

CN         1369540 A      9/2002
CN       102053595 A  *  5/2011
(Continued)

OTHER PUBLICATIONS

Raileanu et al., "Edge Computing in Industrial IoT Framework for Cloud-based Manufacturing Control," 2018 22nd International Conference on System Theory, Control and Computing (ICSTCC), 2018, pp. 261-266, doi: 10.1109/ICSTCC.2018.8540725. (Year: 2018).*

(Continued)

*Primary Examiner* — Ross Varndell
(74) *Attorney, Agent, or Firm* — Muncy, Geissler, Olds & Lowe, P.C.

(57) ABSTRACT

The edge-cloud collaboration platform for intelligent coking monitoring of cracking furnace tubes includes an edge layer and a cloud layer, which can store and analyze big data, propose suggestions on optimization and improvement, and (Continued)

feed the suggestions back to the edge layer. The edge layer includes an intelligent temperature measuring device for an outer surface of a cracking furnace tube and/or an ethylene DCS/data acquisition device; the cloud layer includes a cracking furnace safety warning device, an intelligent coking diagnosis and prediction device for a cracking furnace tube, a hybrid job scheduling device, a multi-workflow scheduling device, a virtualized resource scheduling device, and a virtual resource optimization device; and the intelligent temperature measuring device for an outer surface of a cracking furnace tube includes an identification device for furnace tube and overlapped tube, and an abnormal data detection device.

4 Claims, 2 Drawing Sheets

(52) U.S. Cl.
CPC ......... *G06K 9/6256* (2013.01); *G06K 9/6277* (2013.01); *G06K 9/6284* (2013.01)

(56) References Cited

FOREIGN PATENT DOCUMENTS

| | | | |
|---|---|---|---|
| CN | 103207949 | A | 7/2013 |
| CN | 104374478 | A * | 2/2015 |
| CN | 205228645 | U | 5/2016 |
| CN | 107367331 | A | 11/2017 |
| CN | 206990111 | U | 2/2018 |
| CN | 107894710 | A | 4/2018 |
| CN | 108072448 | A | 5/2018 |
| CN | 108106753 | A | 6/2018 |
| CN | 108681656 | A | 10/2018 |
| CN | 108803534 | A | 11/2018 |
| CN | 108958195 | A | 12/2018 |
| CN | 109858707 | A | 6/2019 |
| CN | 110197199 | A | 9/2019 |
| CN | 110222814 | A | 9/2019 |
| CN | 110343541 | A | 10/2019 |
| WO | WO-2017194369 | A1 | 11/2017 |

OTHER PUBLICATIONS

J. Zhao, Z. Peng, D. Cui, Q. Li, J. He and J. Qiu, "A Method for Measuring Tube Metal Temperature of Ethylene Cracking Furnace Tubes Based on Machine Learning and Neural Network," in IEEE Access, vol. 7, pp. 158643-158654, 2019, doi: 10.1109/ACCESS. 2019.2950419. (Year: 2019).*

International Search Report issued in corresponding to PCT Application No. PCT/CN2020/092649 dated Jul. 31, 2020. (pp. 8).

* cited by examiner

EDGE-CLOUD COLLABORATION PLATFORM FOR INTELLIGENT COKING MONITORING OF CRACKING FURNACE TUBES AND WORKING METHOD THEREOF

CROSS REFERENCE TO RELATED APPLICATIONS

The present application is a continuation of International Application No. PCT/CN2020/092649, filed on May 27, 2020, which claims priority from Chinese Patent Application No. 201910526431.4 filed on Jun. 18, 2019, all of which are hereby incorporated herein by reference.

TECHNICAL FIELD

The present invention relates to the technical field of intelligent monitoring for cracking furnaces, and more particularly to an edge-cloud collaboration platform for intelligent coking monitoring of cracking furnace tubes and a working method thereof.

BACKGROUND

The ethylene industry, as a core of petrochemical industry has been considered as one of the important indicators to measure petrochemical development level of one country in the world. A cracking furnace is a core equipment in the ethylene industry, and a cracking furnace tube is a critical component of the cracking furnace. Since cracking furnace tubes are in flue gas of high-temperature flames, it is an inevitable phenomenon during production that local overheating of furnace tube occurs due to coking inside the furnace tube, which leads to failures in the form of furnace tube carburization, cracking, leak stoppage, tube leakage, thinning, and the like. In various forms of failures of cracking furnace tubes, most failures have direct relation with temperature. Ethylene production companies thus attach great importance to monitoring outer surface temperature of the furnace tubes.

In the prior art, a main method of measuring outer surface temperature of cracking furnace tubes is by means of non-contact automatic measurement of the outer surface temperature of the cracking furnace tube by an intelligent temperature measuring device. However, no data transmission exists between the intelligent temperature measuring instruments that only perform separate storage or processing. Data can only be acquired separately from each temperature measuring instrument. In an actual production process, a large number of devices are included, and the cracking furnace tubes have complex situations under a high-temperature and high-pressure environment with strong air flow and vibration driven by jet flames of a combustion nozzle, and thus it usually requires to monitor the operating state of the devices so as to facilitate finding abnormal situations of devices and data in a timely manner. However, the existing monitoring method generally refers to online system monitoring performed by staff, which is high in cost, complex in structure, and not easy to maintain.

In the process of monitoring the outer surface temperature of the cracking furnace tube by the intelligent temperature measuring device, it is also found that the furnace tubes often block each other and seriously overlap each other. This phenomenon is also referred to as overlapped tube. The presence of phenomenon of overlapped tube may result in some difficulty in the process of distinguishing and calculating the outer surface temperature of each cracking furnace tube.

Further, data that deviates significantly from other data and does not follow general conduct or pattern of data tend to appear in a measured data set, which are referred to as outliers. The presence of outliers may be caused by data noise or due to the occurrence of special abnormal behaviors and states in the data source. However, most of the current outlier detection methods can only be used for single-variable numeric outlier detection, but not suitable for the case of high-dimensional space and multivariable data; and some methods have to calculate a distance between each sample point, which leads to worse detection performance and low efficiency.

SUMMARY

The present invention thus provides an edge-cloud collaboration platform for intelligent coking monitoring of cracking furnace tubes, which can store and analyze big data in a cloud layer, propose suggestions on optimization and improvement, and feed the suggestions back to an edge layer.

According to the present invention, the edge-cloud collaboration platform includes an edge layer and a cloud layer, in which the edge layer includes an intelligent temperature measuring device for an outer surface of a cracking furnace tube and/or an ethylene DCS/data acquisition device; the intelligent temperature measuring device for an outer surface of a cracking furnace tube includes a furnace tube temperature metering device, a target temperature distance measuring device, and a position angle optimization device; the ethylene DCS/data acquisition device includes one or more of a furnace tube outlet temperature device, a venturi pressure device, and a crossover section pressure device; the intelligent temperature measuring device for an outer surface of the cracking furnace tubes includes an overlapped tube identification device for the furnace tubes and, and an abnormal data detection device.

In the above technical solutions, the edge-cloud collaboration platform includes an edge layer and a cloud layer, in which the edge layer includes an intelligent temperature measuring device for an outer surface of a cracking furnace tube and/or an ethylene DCS/data acquisition device; the edge layer can perform cracking furnace data acquisition with a wide range and a deep level, perform protocol conversion and edge processing of heterogeneous data, and achieve data integration to a cloud platform. The intelligent temperature measuring device for an outer surface of a cracking furnace tube includes a furnace tube temperature metering device, a target temperature distance measuring device, a position angle optimization device; the ethylene DCS/data acquisition device includes one or more of a furnace tube outlet temperature device, a venturi pressure device, and a crossover section pressure device.

In the above technical solutions, the cloud layer includes a cracking furnace safety warning device, an intelligent coking diagnosis and prediction device for a cracking furnace tube, a hybrid job scheduling device, a multi-workflow scheduling device, a virtualized resource scheduling device, and a virtual resource optimization device.

The cloud layer uses enterprise private cloud as the infrastructure, and achieves the storage and intelligent analysis of big data in the ethylene industry combined with virtualized resource management and cloud job scheduling. The cloud layer includes a cracking furnace safety warning device, an intelligent coking diagnosis and prediction device for the cracking furnace tube, a hybrid job scheduling device, a multi-workflow scheduling device, a virtualized resource scheduling device, and a virtual resource optimization device. The intelligent temperature measuring device for an outer surface of a cracking furnace tube includes an overlapped tube identification device for the furnace tube, and an abnormal data detection device.

The edge layer and the cloud layer achieve whole process optimization for lifecycle of a cracking furnace tube in a collaborative manner; the edge-cloud collaboration ability and connotation primarily include data collaboration and intelligence collaboration.

Data collaboration: edge nodes acquire ethylene cracking furnace operating parameters, perform preliminary processing and analysis on the data in accordance with rules and data model, upload the processed data to the cloud, in which the data uploaded from the edge layer to the cloud platform in the present collaboration platform includes the outer surface temperature of the cracking furnace tube obtained by the intelligent temperature measuring device independently developed by a research group, and the cracking furnace tube outlet temperature, the venturi pressure, and the crossover section pressure that are acquired by the ethylene DCS/data acquisition device mounted by a petrochemical enterprise, and the like; the cloud constantly receives the data of the edge nodes, and performs big data statistical analysis based on that the mass operation state data includes abnormal state data, including data-driven furnace tube intelligent coking monitoring and scalable value-added services such as furnace tube coking, furnace tube maintenance, furnace tube replacement, separate optimization for furnace hearth and thermal field, and cracking furnace safety warning.

Intelligence collaboration: On the one hand, an edge node provides data input for cloud cracking furnace intelligent coking prediction model training; on the other hand, the edge node is responsible for edge inference execution, i.e., executing a CNN-based detection algorithm for overlapped tube of the cracking furnace to realize accurate measurement of outer surface temperature of each furnace tube in a cracking furnace (in the present collaboration platform, an edge node, i.e., a non-contact intelligent temperature measuring instrument, which realizes efficient intelligent collaboration by deploying AI chips). The cloud refines relevant critical operating parameter models through large data analysis and abstraction, including outlier detection based on Gaussian mixture models, continuous optimization training and compression transplantation of CNN network parameters, and providing suggestions of optimizing and adjusting field devices and ensuring that the devices are in normal operation and production efficiency is improved.

Further, the overlapped tube identification device for the furnace tube includes an intelligent temperature measuring instrument, a PC terminal, and a cloud server. The intelligent temperature measuring instrument includes an internal integrated infrared temperature measuring module, a laser ranging module, and an embedded processor. Data obtained by the internal integrated infrared temperature measuring module and the laser ranging module are transmitted to the PC terminal and/or the cloud server after being processed by the embedded processor.

The internal integrated infrared temperature measuring module of the intelligent temperature measuring instrument is used for temperature measurement, the laser ranging module is used for ranging, and data obtained by the internal integrated infrared temperature measuring module and the laser ranging module are transmitted to the pc terminal and/or the cloud server after being processed by the embedded processor.

Further, the present invention provides a working method of the above-mentioned edge-cloud collaboration platform, including the following steps:

S1, the edge layer acquiring data and performing preliminary processing and analysis;

S2, the cloud layer receiving data and performing big data statistical analysis; and S3, the cloud layer proposing suggestions of optimizing and improving the edge layer.

The edge layer includes an intelligent temperature measuring device for the outer surface of the cracking furnace tube and an ethylene DCS/data acquisition device. The edge layer thus can perform cracking furnace data acquisition with a wide range and a deep level, perform protocol conversion and edge processing of heterogeneous data, and achieve data integration to a cloud platform. The cloud constantly receives the data of the edge nodes, and performs big data statistical analysis based on that the mass operation state data includes abnormal state data, including data-driven furnace tube intelligent coking monitoring and scalable value-added services such as furnace tube coking, furnace tube maintenance, furnace tube replacement, separate optimization for furnace hearth and thermal field, and cracking furnace safety warning. The cloud layer provides suggestions of optimizing and adjusting the field devices, and ensures that the devices are in normal operation and the production efficiency is improved.

Further, the step S1 includes an overlapped tube identification method for the furnace tube and, including:

S111, acquiring data;

S112, constructing a DCNN-based overlapped tube identification model for the furnace tube;

S113, reconstructing a DCNN-based overlapped tube identification model for the furnace tube;

S114, metering the outer surface temperature of the furnace tube; and

S115, uploading to the cloud server.

Further, the step S1 includes an abnormal data detection method, in which the abnormal data are outliers, the method includes:

S121, collecting outer wall temperature of the ethylene cracking furnace tube as a target data set by an intelligent temperature measuring instrument;

S122, training the target data set by a Gaussian mixture model;

S123, associating sample points in the training data with constituent points of the Gaussian mixture model according to training results;

S124, screening the constituent points in a predetermined standard deviation calculation manner; and S125, acquiring the outliers in the sample points according to the screening results.

Further, in step S111, the internal integrated infrared temperature measuring module and the laser ranging module of the intelligent temperature measuring instrument collects raw one-dimensional data of the outer surface temperature and distance of the furnace tube and the inner wall temperature and distance of the furnace hearth;

in step S112, a DCNN-based overlapped tube identification model for furnace tube is constructed. The raw one-dimensional data acquired by the intelligent temperature measuring instrument is transmitted to the PC terminal, the PC terminal transforms the acquired raw one-dimensional data into a two-dimensional histogram; feature extraction is performed on the furnace tube distance data in the two-dimensional histogram to obtain a distance feature map of overlapped tube and non-overlapped tube of the furnace tube so as to form a data set for a DCNN network model to train; and the data set is input into the DCNN network model of the PC terminal so as to train the data set and build a DCNN overlapped tube recognition model at the PC terminal;

in step S113, a DCNN-based overlapped tube identification model for the furnace tube reconstructed: the DCNN-based overlapped tube identification model for the furnace tube after being trained by the PC terminal is transplanted to the embedded processor inside the intelligent temperature measuring instrument so as to reconstruct the DCNN overlapped tube recognition model within the embedded processor;

in step S114, the outer surface temperature of the furnace tube is metered The intelligent temperature measuring instrument collects raw one-dimensional data of the outer surface temperature and distance of the furnace tube and the inner wall temperature and distance of the furnace hearth in real time, extracts furnace tube distance data in the raw one-dimensional data, and returns initial position coordinates of the furnace tube distance data in the raw one-dimensional data, determines whether the furnace tube corresponding to the extracted furnace tube distance data is an overlapped tube by using the DCNN overlapped tube identification model in the embedded processor, returns an identification type label for each furnace tube, and meters the outer surface temperature of the furnace tube of the non-overlapped tube and overlapped tube at corresponding starting position coordinates according to the starting position coordinates of the returned furnace tube identification type label and the furnace tube distance data; and in step S115, the intelligent temperature measuring instrument uploads the calculated outer surface temperature of the furnace tube to the cloud server.

In the above technical solution, it is preferable to use STM32F767VET6 having CortexM7 as the kernel as the embedded processor of the intelligent temperature measuring instrument, and deploy an optimized software kernel of a neural network on the embedded processor as CMSISNN, in which the CMSISNN kernel library includes functions such as deep convolution, pooling, activation, and full connection that are required for implementation of the DCNN network, and thus it is possible for us to reconstruct the DCNN overlapped tube recognition model in the embedded processor.

Firstly, according to the present invention, the difference in distance features of overlapped tube and non-overlapped tube is used to train and generate the DCNN overlapped tube recognition model. Secondly, according to the characteristics of the embedded processor, the DCNN overlapped tube recognition model is transplanted to the embedded processor in the intelligent temperature measuring instrument. Then, the DCNN overlapped tube recognition model combines the data processing algorithm and temperature value measurement method inside the intelligent temperature measuring instrument so as to calculate and obtain the temperature of the overlapped tube and the non-overlapped tube. The DCNN overlapped tube recognition model trained by the present invention can distinguish overlapped tube and non-overlapped tube with high precision, which increases measurement accuracy of outer surface temperature of the crack furnace tube, and realizes edge computing function of the intelligent temperature measuring instrument.

Further, in step S112, during feature extraction of the furnace tube distance data in the two-dimensional histogram, the temperature data of the outer surface of the furnace tube and the inner wall of the furnace hearth in the two-dimensional histogram are removed first, the distance data of the inner wall of the furnace hearth in the two-dimensional histogram is removed, and then invalid threshold data with low relevance in the furnace tube distance data is removed to extract the distance feature map of overlapped tube and non-overlapped tube of the furnace tube.

Further, the step S122 of training the target data set by using a Gaussian mixture model, including:

initializing a first parameter of the Gaussian mixture model ($\{(\alpha_i, \mu_i, \Sigma_i) | 1 \leq i \leq k\}$); and computing the sample points to generate a posterior probability of the constituent points by utilizing a first formula:

$$p_M(z_j = i | x_j) = \frac{P(z_j = i) \cdot p_M(x_j | z_j = i)}{p_M(x_j)} = \frac{\alpha_i \cdot p(x_j | \mu_i, \Sigma_i)}{\sum_{l=1}^{k} \alpha_l \cdot p(x_j | \mu_l, \Sigma_l)},$$

in which $P_M$ is a posterior probability of $Z_j$, the posterior probability of $Z_j$ is a posterior probability, generated by an i-th constituent point, of the sample point $X_j$.

Further, the step S122 of training the target data set by using a Gaussian mixture model, including:

calculating a second parameter $\{'_i, \mu'_i) | i=1, 2, \ldots k\}$ of the Gaussian mixture model by using a second formula $$\begin{cases} \mu_i = \dfrac{\sum_{j=1}^{m} \gamma_{ji} x_j}{\sum_{j=1}^{m} \gamma_{ji}} \\ \Sigma_i = \dfrac{\sum_{j=1}^{m} \gamma_{ji}(x_j - \mu_i)(x_j - \mu_i)^T}{\sum_{j=1}^{m} \gamma_{ji}} \\ \alpha_i = \dfrac{1}{m}\sum_{j=1}^{m} \gamma_{ji} \end{cases};$$

converting the first parameter to the second parameter;

calculating and generating the posterior probability of the constituent points according to the first formula based on the second parameter; and recalculating the second parameter according to the posteriori probability by using the second formula.

Further, the step S123 of associating sample points in the training data with constituent points of the Gaussian mixture model according to training results, including:

associating each of the sample points in the target data set onto a corresponding constituent point; and calculating a mean value and/or variance of parameters of the constituent points.

The step S124 of screening the constituent points in a predetermined standard deviation calculation manner, including: performing deviation calculation on the mean value and variance of parameters by using a triple standard deviation method to generate a corresponding range of difference values; screening the constituent points according to the range of difference values, and determining that the constituent points falling outside of the range of difference values are the outliers.

Compared with the prior art, some beneficial effects of the present invention can be obtained. 1. The edge layer can perform cracking furnace data acquisition with a wide range and a deep level, perform protocol conversion and edge processing of heterogeneous data, and achieve data integration to a cloud platform; the cloud layer achieves storage and intelligent analysis of big data and provides a plurality of value-added services. At the same time, the cloud layer provides suggestions of optimizing and adjusting the field devices, and ensures that the devices are in normal operation and the production efficiency is improved.

2. The overlapped tube recognition method provided by the present invention can distinguish overlapped tube and non-overlapped tube with high precision, which increases measurement accuracy of outer surface temperature of the crack furnace tube, and realizes edge computing function of the intelligent temperature measuring instrument.

3. The abnormal data detection method provided by the present invention can quickly and accurately detect the outliers by utilizing the fast-convergence advantage of the Gaussian mixture model.

In summary, the cloud layer of the edge-cloud collaboration platform in the present invention can store and analyze big data, propose suggestions on optimization and improvement, and feed the suggestions back to the edge layer. The working method of the edge-cloud collaboration platform can perform high-precision overlapped tube recognition, and quickly and accurately detect the outliers.

DETAILED DESCRIPTION OF EMBODIMENTS

Figure 1:
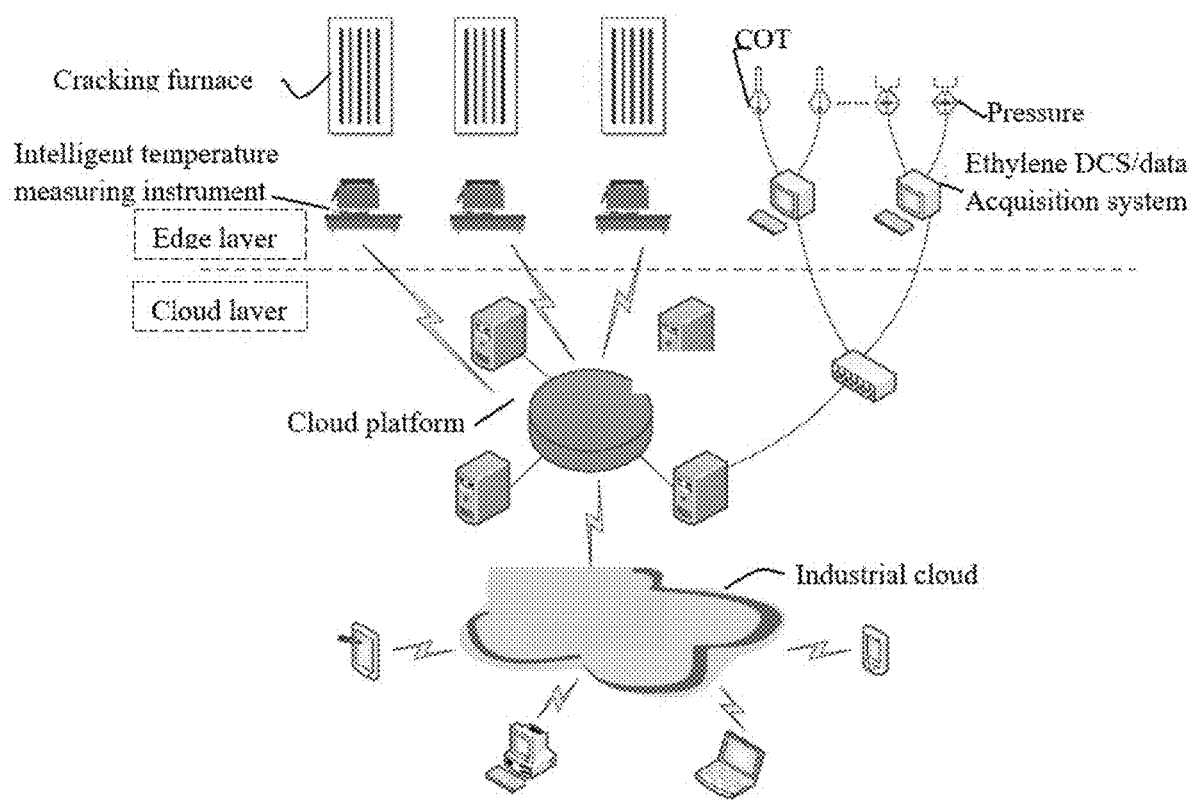
FIG. 1 is an architecture diagram of an edge-cloud collaboration platform for intelligent coking monitoring of cracking furnace tubes according to an embodiment.

The drawings of the present invention are for illustrative purpose only and are not to be construed as limiting the invention. Some components in the drawings may be omitted, enlarged, or reduced for better illustrating the following embodiments, and sizes of these components do not represent that of actual products. For those skilled in the art, it will be understood that some known structures and descriptions thereof in the drawings may be omitted.

Figure 2:
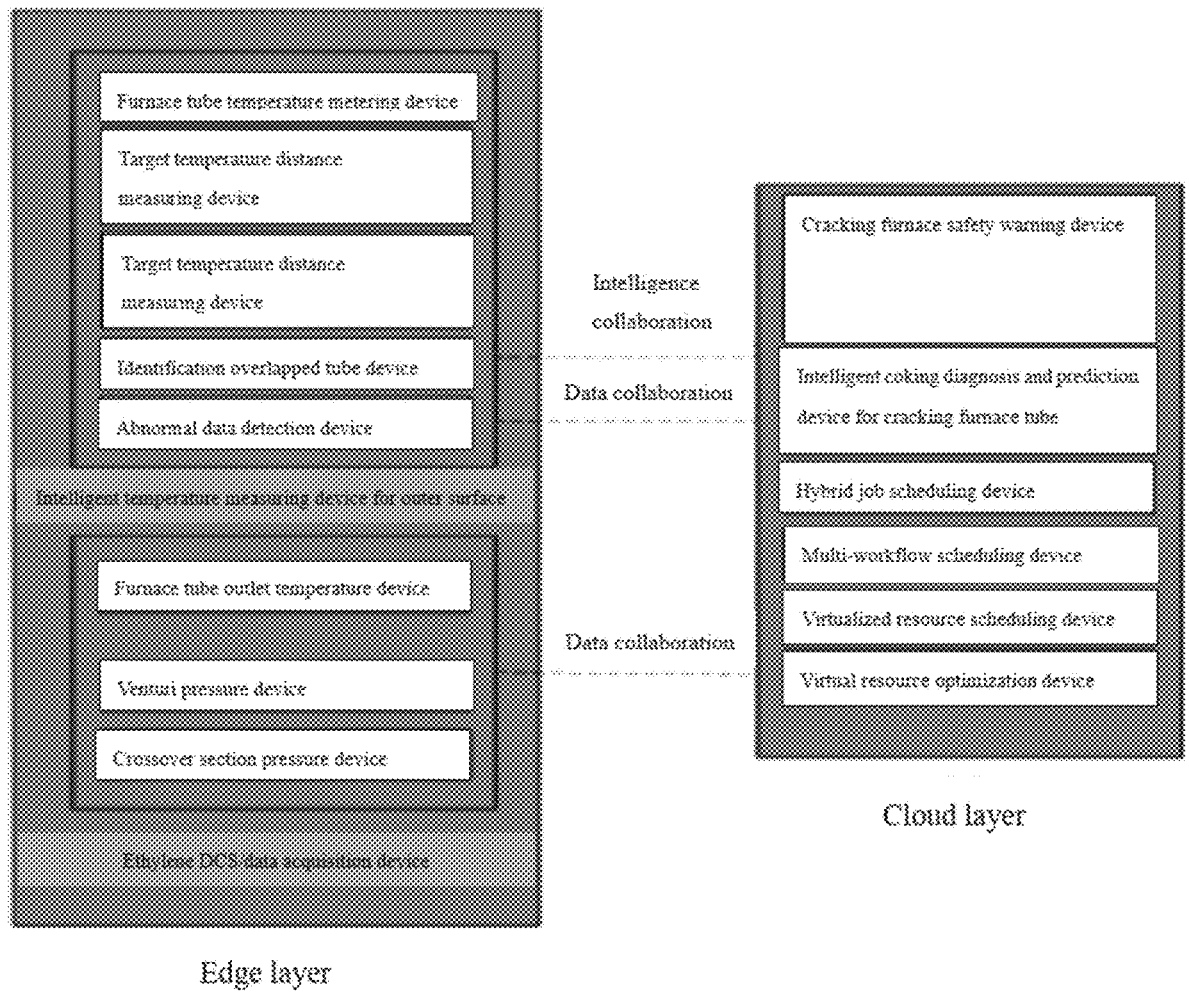
FIG. 2 is a frame diagram showing a collaboration ability of the edge-cloud collaboration platform according to an embodiment.

As shown in FIGS. 1 and 2, an edge-cloud collaboration platform for intelligent coking monitoring of the cracking furnace tubes according to an embodiment includes an edge layer and a cloud layer. The edge layer includes an intelligent temperature measuring device for an outer surface of a cracking furnace tube and/or an ethylene DCS/data acquisition device. The intelligent temperature measuring device for an outer surface of a cracking furnace tube includes a furnace tube temperature metering device, a target temperature distance measuring device, and a position angle optimization device. The ethylene DCS/data acquisition device includes one or more of a furnace tube outlet temperature device, a venturi pressure device, and a crossover section pressure device. The cloud layer includes a cracking furnace safety warning device, an intelligent coking diagnosis and prediction device for the cracking furnace tube, a hybrid job scheduling device, a multi-workflow scheduling device, a virtualized resource scheduling device, and a virtual resource optimization device. The intelligent temperature measuring device for the outer surface of the cracking furnace tube includes an overlapped tube identification device for the furnace tube, and an abnormal data detection device.

As shown in a frame diagram in FIG. 2 showing a collaboration ability of the edge-cloud collaboration platform, the edge-cloud collaboration platform includes an edge layer and a cloud layer. The edge layer includes an intelligent temperature measuring device for an outer surface of a cracking furnace tube and/or an ethylene DCS/data acquisition device. The edge layer thus can perform cracking furnace data acquisition with a wide range and a deep level, perform protocol conversion and edge processing of heterogeneous data, and achieve data integration to a cloud platform. The intelligent temperature measuring device for the outer surface of the cracking furnace tube includes a furnace tube temperature metering device, a target temperature distance measuring device, a position angle optimization device; the ethylene DCS/data acquisition device includes one or more of a furnace tube outlet temperature device, a venturi pressure device, and a crossover section pressure device.

The cloud layer uses enterprise private cloud as the infrastructure, and achieves the storage and intelligent analysis of big data in the ethylene industry combined with virtualized resource management and cloud job scheduling. The cloud layer includes a cracking furnace safety warning device, an intelligent coking diagnosis and prediction device for the cracking furnace tube, a hybrid job scheduling device, a multi-workflow scheduling device, a virtualized resource scheduling device, and a virtual resource optimization device. The intelligent temperature measuring device for the outer surface of the cracking furnace tube includes an overlapped tube identification device for the furnace tube, and an abnormal data detection device.

The edge layer and the cloud layer achieve whole process optimization for lifecycle of a cracking furnace tube in a collaborative manner; the edge-cloud collaboration ability and connotation primarily include data collaboration and intelligence collaboration.

Data collaboration: edge nodes acquire ethylene cracking furnace operating parameters, perform preliminary processing and analysis on the data in accordance with rules and data model, upload the processed data to the cloud, in which the data uploaded from the edge layer to the cloud platform in the present collaboration platform includes the outer surface temperature of the cracking furnace tube obtained by the intelligent temperature measuring device independently developed by a research group, and the cracking furnace tube outlet temperature, the venturi pressure, and the crossover section pressure that are acquired by the ethylene DCS/data acquisition device mounted by a petrochemical enterprise. The cloud constantly receives the data of the edge nodes, and performs big data statistical analysis based on that the mass operation state data includes abnormal state data, including data-driven furnace tube intelligent coking monitoring and scalable value-added services such as furnace tube coking, furnace tube maintenance, furnace tube replacement, separate optimization for furnace hearth and thermal field, and cracking furnace safety warning.

Intelligence collaboration: On the one hand, an edge node provides data input for cloud cracking furnace intelligent coking prediction model training; on the other hand, the edge node is responsible for edge inference execution, i.e., executing a CNN-based detection algorithm for overlapped tube of the cracking furnace to realize accurate measurement of outer surface temperature of each furnace tube in a cracking furnace (in the present collaboration platform, an edge node, i.e., a non-contact intelligent temperature measuring instrument, which realizes efficient intelligent collaboration by deploying AI chips). The cloud refines relevant critical operating parameter models through large data analysis and abstraction, including outlier detection based on Gaussian mixture models, continuous optimization training and compression transplantation of CNN network parameters, and providing suggestions of optimizing and adjusting field devices and ensuring that the devices are in normal operation and production efficiency is improved.

The overlapped tube identification device for furnace tube includes an intelligent temperature measuring instrument, a PC terminal, and a cloud server. The intelligent temperature measuring instrument includes an internal integrated infrared temperature measuring module, a laser ranging module, and an embedded processor. Data obtained by the internal integrated infrared temperature measuring module and the laser ranging module are transmitted to the PC terminal and/or the cloud server after being processed by the embedded processor. The internal integrated infrared temperature measuring module of the intelligent temperature measuring instrument is used for temperature measurement, the laser ranging module is used for ranging, and data obtained by the internal integrated infrared temperature measuring module and the laser ranging module are transmitted to the PC terminal and/or the cloud server after being processed by the embedded processor.

The working method of the edge-cloud collaboration platform for intelligent coking monitoring of the cracking furnace tube, including the following steps: S1. the edge layer acquiring data and performing preliminary processing and analysis; S2. the cloud layer receiving data and performing big data statistical analysis; and S3. the cloud layer proposing suggestions of optimizing and improving the edge layer.

The edge layer includes an intelligent temperature measuring device for the outer surface of the cracking furnace tube and the ethylene DCS/data acquisition device, the edge layer thus can perform cracking furnace data acquisition with a wide range and a deep level, perform protocol conversion and edge processing of heterogeneous data, and achieve data integration to a cloud platform. The cloud constantly receives the data of the edge nodes, and performs big data statistical analysis based on that the mass operation state data includes abnormal state data, including data-driven furnace tube intelligent coking monitoring and scalable value-added services such as furnace tube coking, furnace tube maintenance, furnace tube replacement, separate optimization for furnace hearth and thermal field, and cracking furnace safety warning. The cloud layer provides suggestions of optimizing and adjusting the field devices, and ensures that the devices are in normal operation and the production efficiency is improved.

The step S1 includes an overlapped tube identification method for furnace tube, including
S111. acquiring data;
S112. constructing a DCNN-based overlapped tube identification model for the furnace tubes;
S113. reconstructing a DCNN-based overlapped tube identification model for the furnace tubes;
S114. metering the outer surface temperature of the furnace tubes; and
S115. uploading the outer surface temperature of the furnace tubes to the cloud server.

The step S1 includes an abnormal data detection method, in which the abnormal data are outliers, the method includes:

S121. collecting outer wall temperature of the ethylene cracking furnace tube as a target data set by an intelligent temperature measuring instrument;
S122. training the target data set by a Gaussian mixture model;
S123. associating sample points in the training data with constituent points of the Gaussian mixture model according to training results;
S124. screening the constituent points in a predetermined standard deviation calculation manner; and
S125. acquiring the outliers in the sample points according to the screening results.

Specifically, in step S111, the internal integrated infrared temperature measuring module and the laser ranging module of the intelligent temperature measuring instrument collects raw one-dimensional data of the outer surface temperature and distance of the furnace tube and the inner wall temperature and distance of the furnace hearth;

in step S112, a DCNN-based overlapped tube identification model for furnace tube is constructed. The raw one-dimensional data acquired by the intelligent temperature measuring instrument is transmitted to the PC terminal, the PC terminal transforms the acquired raw one-dimensional data into a two-dimensional histogram; feature extraction is performed on the furnace tube distance data in the two-dimensional histogram to obtain a distance feature map of overlapped tube and non-overlapped tube of the furnace tube so as to form a data set for a DCNN network model to train; and the data set is input into the DCNN network model of the PC terminal so as to train the data set and build a DCNN overlapped tube recognition model at the PC terminal;

in step S113, a DCNN-based overlapped tube identification model for the furnace tube is reconstructed. The DCNN-based overlapped tube identification model for the furnace tube after being trained by the PC terminal is transplanted to the embedded processor inside the intelligent temperature measuring instrument so as to reconstruct the DCNN overlapped tube recognition model within the embedded processor;

in step S114, the outer surface temperature of the furnace tube is metered. The intelligent temperature measuring instrument collects raw one-dimensional data of the outer surface temperature and distance of the furnace tube and the inner wall temperature and distance of the furnace hearth in real time, extracts furnace tube distance data in the raw one-dimensional data, and returns initial position coordinates of the furnace tube distance data in the raw one-dimensional data, determines whether the furnace tube corresponding to the extracted furnace tube distance data is an overlapped tube by using the DCNN overlapped tube identification model in the embedded processor, returns an identification type label for each furnace tube, and meters the outer surface temperature of the furnace tube of the non-overlapped tube and overlapped tube at corresponding starting position coordinates according to the starting position coordinates of the returned furnace tube identification type label and the furnace tube distance data; and in step S115, the intelligent temperature measuring instrument uploads the calculated outer surface temperature of the furnace tube to the cloud server.

It is preferable to use STM32F767VET6 having CortexM7 as the kernel as the embedded processor of the intelligent temperature measuring instrument, and deploy an optimized software kernel of a neural network on the embedded processor as CMSISNN, in which the CMSISNN kernel library includes functions such as deep convolution, pooling, activation, and full connection that are required for implementation of the DCNN network, and thus it is possible for us to reconstruct the DCNN overlapped tube recognition model in the embedded processor.

Firstly, according to the embodiment, the difference in distance features of overlapped tube and non-overlapped tube is used to train and generate the DCNN overlapped tube recognition model. Secondly, according to the characteristics of the embedded processor, the DCNN overlapped tube recognition model is transplanted to the embedded processor in the intelligent temperature measuring instrument. Then, the DCNN overlapped tube recognition model combines the data processing algorithm and temperature value measurement method inside the intelligent temperature measuring instrument so as to calculate and obtain the temperature of the overlapped tube and the non-overlapped tube. The DCNN overlapped tube recognition model trained by the present embodiment can distinguish overlapped tube and non-overlapped tube with high precision, which increases measurement accuracy of outer surface temperature of the crack furnace tube, and realizes edge computing function of the intelligent temperature measuring instrument.

In the step S112, during feature extraction of the furnace tube distance data in the two-dimensional histogram, the temperature data of the outer surface of the furnace tube and the inner wall of the furnace hearth in the two-dimensional histogram are removed first, the distance data of the inner wall of the furnace hearth in the two-dimensional histogram is removed, and then invalid threshold data with low relevance in the furnace tube distance data is removed to extract the distance feature map of overlapped tube and non-overlapped tube of the furnace tube.

The step S122 of training the target data set by using a Gaussian mixture model, including:

initializing a first parameter $\{(\alpha_i, \mu_i, \Sigma_i) | 1 \leq i \leq k\}$ of the Gaussian mixture model; and computing the sample points to generate a posterior probability of the constituent points by utilizing a first formula:

$$p_M(z_j = i | x_j) = \frac{P(z_j = i) \cdot p_M(x_j | z_j = i)}{p_M(x_j)} = \frac{\alpha_i \cdot p(x_j | \mu_i, \Sigma_i)}{\sum_{l=1}^{k} \alpha_l \cdot p(x_j | \mu_i, \Sigma_i)},$$

in which $P_M$ is a posterior probability of $Z_j$, the posterior probability of $Z_j$ is a posterior probability, generated by an i-th constituent point, of the sample point $X_j$.

The step S122 of training the target data set by using a Gaussian mixture model, including:

calculating a second parameter $\{(\alpha'_i, \mu'_i, \Sigma'_i) | i=1, 2, \ldots k\}$ of the Gaussian mixture model by using a second formula $$\begin{cases} \mu_i = \dfrac{\sum_{j=1}^{m} \gamma_{ji} x_j}{\sum_{j=1}^{m} \gamma_{ji}} \\ \Sigma_i = \dfrac{\sum_{j=1}^{m} \gamma_{ji}(x_j - \mu_i)(x_j - \mu_i)^T}{\sum_{j=1}^{m} \gamma_{ji}} \\ \alpha_i = \dfrac{1}{m} \sum_{j=1}^{m} \gamma_{ji} \end{cases}$$

converting the first parameter $\{(\alpha_i, \mu_i, \Sigma_i) | 1 \leq i \leq k\}$ to the second parameter $\{(\alpha'_i, \mu'_i, \Sigma'_i) | i=1, 2, \ldots k\}$;

calculating and generating the posterior probability $\gamma_{ji}$ ($1 \leq i \leq k$) of the constituent points according to the first formula based on the second parameter; and recalculating the second parameter according to the posteriori probability by using the second formula.

Further, the step S123 of associating sample points in the training data with constituent points of the Gaussian mixture model according to training results, including:

associating each of the sample points in the target data set onto a corresponding constituent point; and calculating a mean value and/or variance of parameters of the constituent points.

The step S124 of screening the constituent points in a predetermined standard deviation calculation manner, including: performing deviation calculation on the mean value and variance of parameters by using a triple standard deviation method to generate a corresponding range of difference values; screening the constituent points according to the range of difference values, and determining that the constituent points falling outside of the range of difference values are the outliers.

Obviously, the above embodiments of the present invention are merely examples for clear illustrating the technical solution of the present invention, and are not intended to limit the implementations of the present invention. Any modification, equivalent substitution, improvement, or the like within the spirit and principle of the claims of the present invention should be included in the scope of the claims of the invention.

The invention claimed is:

1. An edge-cloud collaboration platform for intelligent coking monitoring of cracking furnace tubes, comprising:
    an edge layer; and
    a cloud layer,
    wherein the edge layer includes an intelligent temperature measuring device for an outer surface of the cracking furnace tubes and/or an ethylene Distributed Control System (DCS)/data acquisition device;
    the intelligent temperature measuring device includes a furnace tube temperature metering device, a target temperature distance measuring device, and a position angle optimization device;
    the ethylene DCS/data acquisition device includes one or more from a furnace tube outlet temperature device, a venturi pressure device, and a crossover section pressure device; and
    the intelligent temperature measuring device for the outer surface of the cracking furnace tubes further includes an overlapped tube identification device for the furnace tubes, and an abnormal data detection device;
    the cloud layer includes a cracking furnace safety warning device, an intelligent coking diagnosis and prediction device for the cracking furnace tubes, a hybrid job scheduling device, a multi-workflow scheduling device, a virtualized resource scheduling device, and a virtual resource optimization device; and
    the overlapped tube identification device for the furnace tubes includes an intelligent temperature measuring instrument, a PC terminal, and a cloud server; wherein the intelligent temperature measuring instrument includes an internal integrated infrared temperature measuring module, a laser ranging module, and an embedded processor; and data obtained by the internal integrated infrared temperature measuring module and the laser ranging module are transmitted to the PC terminal and/or the cloud server after being processed by the embedded processor;

the abnormal data detection device is configured to detect outliers, outliers are referred to data that deviates significantly from other data and does not follow general conduct or pattern of data tend to appear in a measured data set, which caused by data noise or occurrence of special abnormal behaviors and states in the data source.

2. A working method of the edge-cloud collaboration platform according to claim 1, comprising the steps of:
    S1. the edge layer acquiring data and performing preliminary processing and analysis;
    S2. the cloud layer receiving data and performing big data statistical analysis; and
    S3. the cloud layer proposing suggestions of optimizing and improving the edge layer;
    wherein the step S1 includes an overlapped tube identification method for the furnace tubes, the overlapped tube identification method including:
        S111. acquiring data;
        S112. constructing a Dynamic Convolution Neural Network (DCNN)-based overlapped tube identification model for furnace tubes;
        S113. reconstructing a DCNN-based overlapped tube identification model for the furnace tubes;
        S114. metering an outer surface temperature of the furnace tubes; and
        S115. uploading outer surface temperature of the furnace tubes to the cloud server, and
    wherein the step S1 includes an abnormal data detection method, and the abnormal data are outliers, the abnormal data detection method including:
        S121. collecting an outer surface temperature of the cracking furnace tubes as a target data set by the intelligent temperature measuring instrument;
        S122. training the target data set by using a Gaussian mixture model;
        S123. associating sample points in the training data with constituent points of the Gaussian mixture model according to training results;
        S124. screening the constituent points in a predetermined standard deviation calculation manner; and
        S125. acquiring the outliers in the sample points according to screening results.

3. The working method of the edge-cloud collaboration platform according to claim 2, wherein
    in step S111, the internal integrated infrared temperature measuring module and the laser ranging module of the intelligent temperature measuring instrument collects raw one-dimensional data of the outer surface temperature and a distance of the furnace tubes and an inner wall temperature and a distance of a furnace hearth;
    in step S112, the raw one-dimensional data acquired by the intelligent temperature measuring instrument is transmitted to the PC terminal, the PC terminal transforms the acquired raw one-dimensional data into a two-dimensional histogram; feature extraction is performed on the furnace tube distance data in the two-dimensional histogram to obtain a distance feature map of overlapped tube and non-overlapped tube of the furnace tubes so as to form a data set for a DCNN network model to train; and the data set is input into the DCNN network model of the PC terminal so as to train the data set and build a DCNN overlapped tube recognition model at the PC terminal;
    in step S113, the DCNN-based overlapped tube identification model for the furnace tubes after being trained by the PC terminal is transplanted to the embedded processor inside the intelligent temperature measuring instrument so as to reconstruct the DCNN overlapped tube recognition model within the embedded processor;
    in step S114, the intelligent temperature measuring instrument collects raw one-dimensional data of the outer surface temperature and distance of the furnace tube and the inner wall temperature and distance of the furnace hearth in real time, extracts furnace tube distance data in the raw one-dimensional data, and returns initial position coordinates of the furnace tube distance data in the raw one-dimensional data, determines whether the furnace tube corresponding to the extracted furnace tube distance data is an overlapped tube by using the DCNN overlapped tube identification model in the embedded processor, returns an identification type label for each furnace tube, and meters the outer surface temperature of the furnace tube of the non-overlapped tube and overlapped tube at corresponding starting position coordinates according to the starting position coordinates of the returned furnace tube identification type label and the furnace tube distance data; and
    in step S115, the intelligent temperature measuring instrument uploads the calculated outer surface temperature of the furnace tube to the cloud server.

4. The working method of the edge-cloud collaboration platform according to claim 3, wherein in step S112, during feature extraction of the furnace tube distance data in the two-dimensional histogram, the temperature data of the outer surface of the furnace tube and the inner wall of the furnace hearth in the two-dimensional histogram are removed first, the distance data of the inner wall of the furnace hearth in the two-dimensional histogram is removed, and then invalid threshold data with low relevance in the furnace tube distance data is removed to extract the distance feature map of overlapped tube and non-overlapped tube of the furnace tube.

* * * * *